Nov. 9, 1965   H. R. WALTERS   3,216,041
ROTARY DISC SCRAPER WITH REPLACEABLE SAW BLADES
Filed May 27, 1963
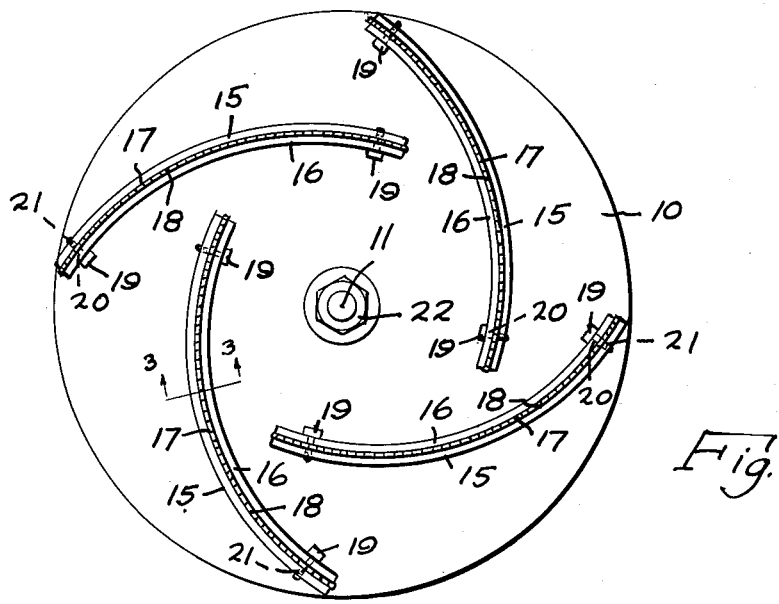
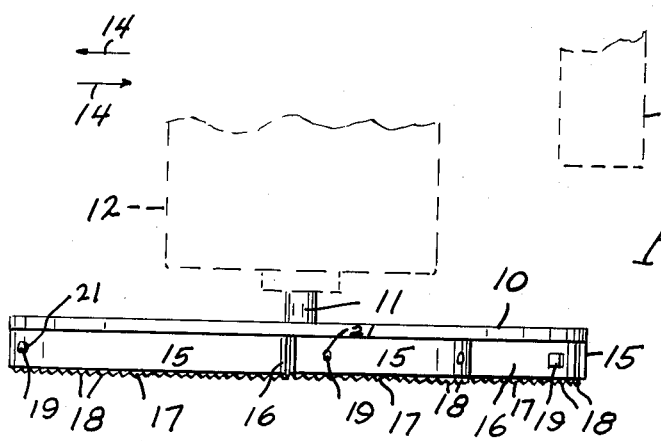
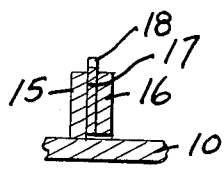
INVENTOR.
Horace R. Walters
BY
Sam J. Slotsky
ATTORNEY

United States Patent Office 3,216,041
Patented Nov. 9, 1965

3,216,041
ROTARY DISC SCRAPER WITH REPLACEABLE SAW BLADES
Horace R. Walters, 1109 Edgewater, Sioux City, Iowa
Filed May 27, 1963, Ser. No. 283,327
1 Claim. (Cl. 15—236)

My invention relates to a rotary disc scraper with replaceable saw blades which can be used as a paint remover or for any other allied purpose.

An object of my invention is to provide a rotary arrangement which can be conveniently attached to a standard sander arrangement.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a bottom view of the saw,

FIGURE 2 is a side elevation of FIGURE 1 showing the unit as attached to a standard rotary motor, FIGURE 3 is an enlarged sectional view taken along the lines 3—3 of FIGURE 1.

My invention contemplates the provision of a disc arrangement which disc arrangement includes certain elements attached thereto whereupon the disc when rotated by a standard electric motor or the like will cut down or properly abrade a paint surface or other surface.

I have used the character 10 to designate a disc having a suitable opening to receive a shaft 11, which shaft 11 is the shaft of an electric motor 12, the electric motor preferably having an integrally formed handle 13 whereby the arrangement can be pushed in either direction of the arrow 14.

Welded to the disc 10 are the vertically positioned arcuate flanges 15, and the character 16 indicates further arcuate straps which are of the same conformation as the straps 15, the straps 16 however being removable and replaceable and positioned between the straps 15 and 16 are the arcuate saw blades 17 having the teeth 18, it being noted that the saw blades 17 are positioned in such a fashion so that during rotation the teeth 18 will be traveling so that they will be abrading the surface in a manner whereby the direction of abrasion will be such that several teeth will be cutting substantially in alignment in the direction of rotation to thereby provide a more efficient abrading action.

The blades 17 are securely held by means of the bolts 19 passing through suitable openings 20 in the straps 16, and being threadably engaged at 21 with the fixed flanges 15, the bolts also passing through the blades. The disc 10 is secured to the shaft 11 by means of the nut and washer arrangement 22.

It will now be noted that by moving the motor 12 in the direction of the arrows 14 and in either direction that the proper abrading effect is obtained for any purpose desired, and the blades can be replaced when necessary. The disc can also be revolved in either direction as desired and it will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A rotary disc scraper with replaceable saw blades comprising a disc, means for rotating said disc, said disc including a plurality of substantially arcuate flanges extending therefrom, the outer ends of said flanges being positioned radially at a substantially greater distance than the inner ends thereof, cutting blades including serrations thereon attached to said flanges, means for clamping said cutting blades to said flanges, including removable substantially arcuate straps adapted to bear against said cutting blades, both passing through said straps and said blades and threadably engaging said flanges.

References Cited by the Examiner

UNITED STATES PATENTS

| 2,193,571 | 3/40 | Siemund | 15—236 |
| 2,633,582 | 4/53 | French | 143—85 X |
| 2,963,059 | 12/60 | Grub | 144—219 X |

FOREIGN PATENTS

| 885,149 | 8/53 | Germany. |
| 176,410 | 6/35 | Switzerland. |

WALTER A. SCHEEL, Primary Examiner.